(12) United States Patent
Testani

(10) Patent No.: US 10,476,368 B2
(45) Date of Patent: Nov. 12, 2019

(54) POWER CONTROL DEVICE

(71) Applicant: Pass & Seymour, Inc., Syracuse, NY (US)

(72) Inventor: Anthony Testani, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 389 days.

(21) Appl. No.: 15/349,290

(22) Filed: Nov. 11, 2016

(65) Prior Publication Data

US 2018/0138799 A1    May 17, 2018

(51) Int. Cl.
*H02M 1/08* (2006.01)
*H05B 37/02* (2006.01)
*H02M 5/293* (2006.01)

(52) U.S. Cl.
CPC ............ *H02M 1/083* (2013.01); *H02M 5/293* (2013.01); *H05B 37/0209* (2013.01)

(58) Field of Classification Search
CPC .................................................. Y10T 307/406
See application file for complete search history.

(56) References Cited

U.S. PATENT DOCUMENTS

2015/0277469 A1* 10/2015 Testani .................... G05F 3/04
307/31

* cited by examiner

*Primary Examiner* — Thienvu V Tran
*Assistant Examiner* — David M Stables
(74) *Attorney, Agent, or Firm* — Bond Schoeneck & King, PLLC; George McGuire

(57) ABSTRACT

An electrical wiring device including a housing assembly including a plurality of terminals; a sensor element configured to provide a sensor signal for monitoring at least one load power parameter of at least one electrical load; at least one variable control mechanism, the at least one variable control mechanism configured to adjustably select a user adjustable load setting; a series pass element configured to regulate output power to the at least one electrical load in accordance with the user load setting; an interface circuit coupled between the AC power, the interface circuit including at least one half wave rectifier coupled to a voltage divider configured to provide a half wave rectified signal; and a signal processing assembly including a time shifting element configured to substantially time shift the half wave rectified signal to provide a zero cross detection signal timed to occur at zero crossings in the AC power.

39 Claims, 9 Drawing Sheets

FIG 6 REG

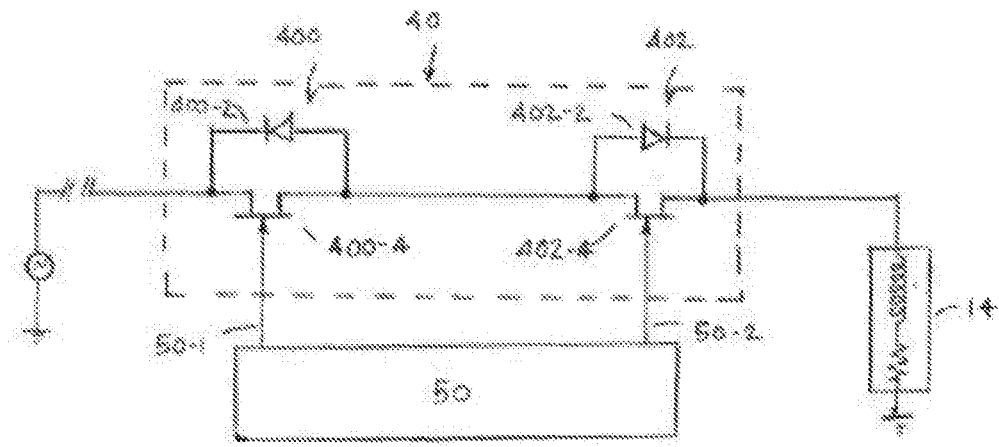
FIGURE 8
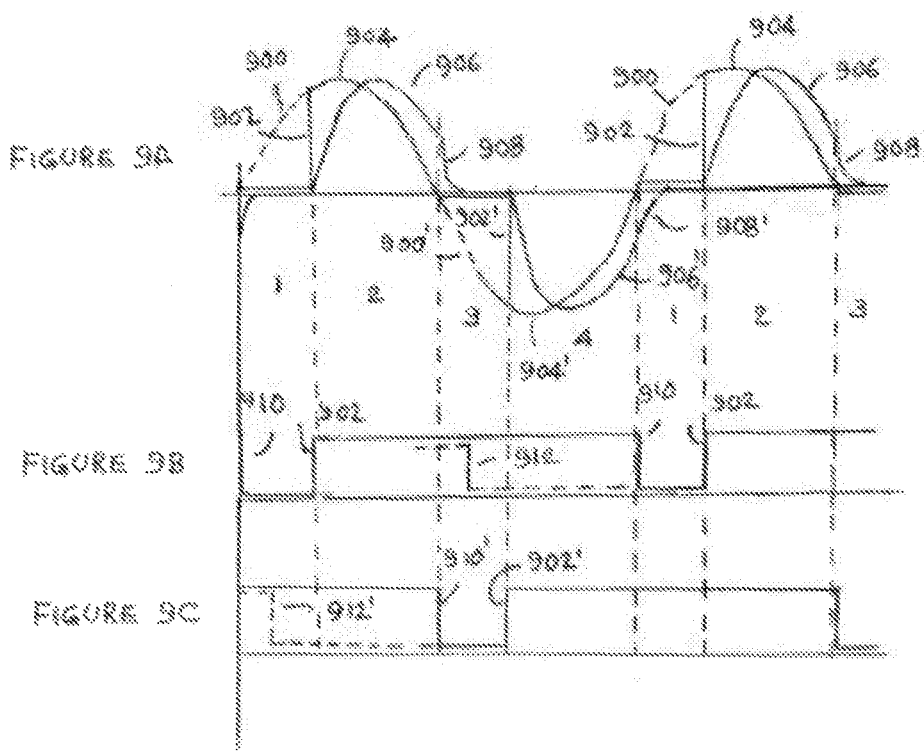
FIGURE 9A
FIGURE 9B
FIGURE 9C

POWER CONTROL DEVICE

BACKGROUND OF THE INVENTION

1. Field of the Invention

The present invention relates generally to electrical wiring devices, and particularly to power control wiring devices such as dimmer and fan speed control devices.

2. Technical Background

In most residences, a simple ON/OFF switch may be the primary way people control the home's lighting fixtures or air-circulating fan fixtures. One obvious drawback to using simple ON/OFF switches to control these devices is experienced by the homeowner when he pays the electrical bill—a given light (or fan) is either ON or OFF—a simple switch is thus unable to vary the amount of light (and hence control the amount of power consumed). Stated differently, by controlling light intensity or fan speed in accordance with needed or desired parameters, electricity usage is reduced, saving money and natural resources. In accordance with the present invention, therefore, a power control device refers to an electrical control device that may be employed to adjust the amount of current delivered to any variable electrical load, such as a light or a motor.

When the electric load is a lighting device, the power control device is commonly referred to as a dimmer. For example, when a light is dimmed 25% by a dimmer, a 20% reduction in the amount of electricity required to operate the lamp is realized. When a light is dimmed by 50%, a 40% electricity reduction is realized. Second, a dimmer greatly extends lamp life because it reduces the strain on the filament. When a light is dimmed 25%, a given lamp lasts four (4) times longer than it would at full power. When the light is dimmed by 50%, it can last as much as 20 times longer (than a light that is continuously operated at full power). If the power control device is configured to control a motor, such as a fan motor, the power control device is referred to as a motor speed controller. Motor speed controllers are also used to control the speed of machinery such as power tools, electric drills, chair lifts, stationary machinery, and other such variable speed motor driven elements.

Power control devices are typically packaged in a wiring device form factor for installation in a wall outlet box. The wiring device may include one or more power control devices within the device housing. For example, wiring devices that are equipped with both fan motor control and lighting control features are ubiquitous. The exterior of the wiring device includes either screw terminals or wire terminals for subsequent connection between the AC power source and the load. The conventional wiring device form factor also provides a user accessible interface that includes one or more switch mechanisms such as buttons, levers, dials, slide switches, and other such input control mechanisms that permit a user to vary the power to a load or turn it ON/OFF.

Prior to device installation, wiring from the AC power source and wiring to the load(s) are disposed inside the outlet box. The outlet box is usually located proximate to the load being controlled. The device is installed by connecting the wiring inside the outlet box to the appropriate wiring device terminals disposed on the exterior of the wiring device. The power control wiring device is then inserted into the outlet box and attached to the outlet box using one or more fasteners. A cover plate is installed to complete the installation. One of the drawbacks associated with older conventional power control devices relates to the fact that many of these devices were often installed without a neutral wire being routed into the device box. What is needed therefore is a power control device that can be employed in any structure being retrofitted or remodeled. Stated differently, a power control device is needed that can work with existing wiring configurations (whether the device box includes a neutral wire or does not include a neutral wire).

Often, a residence includes a three way lighting arrangement whereby one light fixture may be operated by two separate three-way switches. Often, one three-way switch is installed at an upstream location while a second three-way switch is installed at a downstream location. This allows a resident to conveniently turn the lights ON or OFF from two different locations. Unfortunately, this may lead to difficulties when a structure or space is being retrofitted, since certain conventional dimmers may only be installed at one of the three way switch locations. This requires the homeowner to know how the existing wiring is disposed in the room (behind the plaster or sheet rock). What is needed therefore is a dimmer that can be installed at any of the three-way switch locations.

Turning now to so-called "green" issues, the public has developed an increased awareness of the impact that energy generation has on the environment. Moreover, as the economies of countries such as Brazil, India, China, etc. improve and develop their need for energy resources increases accordingly. As such, the global demand for energy has risen sharply, while the supply of planet earth's resources remains fixed. In light of the pressures of supply and demand, the cost of energy resources will only increase. There is thus a need to use limited energy resources more wisely and more efficiently. More efficient light sources and electrical fixtures have been developed to replace the conventional incandescent lighting devices in response to this need. For example, compact fluorescent lights (CFL) and light emitting diode (LED) devices are far more efficient than conventional incandescent lights and thus provide homeowners/tenants with an acceptable level of service while using less energy and incurring lower costs.

One of the drawbacks of conventional dimmer devices relates to the fact that incandescent lights, fluorescent lights, MLV lighting, ELV lighting, CFL devices and LED lighting may have different electrical operating characteristics. Dimmers have a solid state switching component that turns the lamp on during a user adjustable portion of each line frequency cycle and turns the lamp off during the remaining portion of the cycle. Dimmers that turn the load ON at a zero crossing of the line frequency and OFF at a subsequent phase angle are referred to as "reverse phase" dimmers. Dimmers that turn the load ON at selected phase angle and turn the load OFF at the following zero cross are known as "forward phase" dimmers.

Whereas new types of bulbs are energy efficient, one problem that has arisen is that when dimmed to particularly low settings, they are prone to "flickering". This is typically caused by voltage transients in the AC power source that occur during lightning storms or when certain loads are switched on or off. Voltage transients momentarily disturb how long the solid state switching component is ON during the line frequency cycle.

Accordingly, a need exists for a power control device that can drive electrical loads over a wide range of wattages. A need also exists for a dimmer that is capable of dimming a wide variety of lamp sources without the problem of flicker.

SUMMARY OF THE INVENTION

The present invention addresses the needs described above by providing a power control device that obviates or overcomes the drawbacks articulated above.

One aspect of the present invention is directed to an electrical wiring device including: a housing assembly including a plurality of terminals at least partially disposed therein, the plurality of terminals being configured to be coupled to an AC power source and at least one electrical load; a sensor element coupled to the plurality of terminals and configured to provide a sensor signal for monitoring at least one load power parameter of the at least one electrical load; at least one variable control mechanism coupled to the housing assembly, the at least one variable control mechanism being configured to adjustably select a user adjustable load setting, the user adjustable load setting being adjustable between a minimum setting and a maximum setting; a series pass element coupled between the AC power source and at least one electrical load, the series pass element being configured to regulate output power to the at least one electrical load in accordance with the user load setting; an interface circuit coupled between the AC power available at the plurality of terminals, the interface circuit including at least one half wave rectifier coupled to a voltage divider configured to provide a half wave rectified signal; and a signal processing assembly including a time shifting element configured to substantially time shift the half wave rectified signal to provide a zero cross detection signal timed to occur at zero crossings in the AC power.

According to an embodiment, the time shifting element includes a comparator configured to compare the half wave rectified signal to a DC reference voltage.

According to an embodiment, the comparator provides the zero cross signal to a microcomputer.

According to an embodiment, the comparator and the microcomputer are disposed on separate printed circuit boards.

According to an embodiment, the interface circuit includes a capacitor coupled to the voltage divider, the voltage divider including at least one resistor, the capacitor and the at least one resistor forming a time constant that substantially phase shifts the half wave rectified signal with respect to the AC power source, the time shifting element serving to compensate for the time constant to produce the zero cross detection signal.

According to an embodiment, the voltage divider includes at least one reactive element.

According to an embodiment, the interface circuit is coupled to a DC voltage source.

According to an embodiment, the interface circuit includes a capacitor coupled to the voltage divider, the voltage divider including at least one resistor, the capacitor and the at least one resistor forming a time constant that substantially phase shifts the half wave rectified signal with respect to the AC power source, the time shifting element serving to compensate for the time constant to produce the zero cross detection signal.

According to an embodiment, the signal processing assembly includes a microcontroller, the shifting element being disposed in the microcontroller.

According to an embodiment, the microcontroller is further configured to receive at least one input signal from the sensor element or the variable control mechanism and to provide at least one control signal to control the series pass element, the at least one control signal having HIGH state and LOW state intervals.

According to an embodiment, the series pass element includes two switching elements and the at least one control signal includes separate control signals for controlling the two switching elements.

According to an embodiment, the two switching elements are series connected.

According to an embodiment, the separate control signals each assume the HIGH state for portions of a line cycle of the AC power, the HIGH state portions in combination covering a substantial portion of the line cycle irrespective of the user adjustable load setting.

According to an embodiment, one of the control signals is in a HIGH state at the same time that the other control signal is transitioning from a HIGH state to a LOW state, or is in a LOW state at the same time the other control signal is transitioning from a LOW state to a HIGH state.

According to an embodiment, the two switching elements are a pair of field effect transistors each having a bypass element.

According to an embodiment, the zero cross detection signal is a plurality of signals timed to occur at either negative-going or positive-going zero crossings of the AC power source.

According to an embodiment, the plurality of terminals includes two traveller terminals, the at least one half wave rectifier including a diode coupled to each of the traveller terminals.

According to an embodiment, the at least one half wave rectifier includes three rectifiers.

One aspect of the present invention is directed to an electrical wiring device including a housing assembly including a plurality of terminals at least partially disposed therein, the plurality of terminals being configured to be coupled to an AC power source having a waveshape and at least one electrical load; a sensor element coupled to the plurality of terminals and configured to provide a sensor signal for monitoring at least one load power parameter of the at least one electrical load; at least one variable control mechanism coupled to the housing assembly, the at least one variable control mechanism being configured to adjustably select a user adjustable load setting, the user adjustable load setting being adjustable between a minimum setting and a maximum setting; a series pass element coupled between the AC power source and at least one electrical load, the series pass element being configured to regulate output power to the at least one electrical load in accordance with the user load setting; a phase shift element configured to substantially delay at least a portion of the waveshape by a predetermined interval to provide a phase-shifted output signal; and a phase shift compensation element configured to produce a zero-cross detection signal, the phase shift compensation element cancelling the predetermined interval such that the zero-cross detection signal is timed to occur at positive-going or negative-going zero crossings in the AC power source.

According to an embodiment, the phase shift compensation element includes a comparator configured to compare the phase-shifted output signal to a DC reference voltage.

According to an embodiment, the comparator provides the zero cross signal to a microcomputer.

According to an embodiment, the phase shift element includes a capacitor coupled to a voltage divider, the voltage divider including at least one resistor, the capacitor and the at least one resistor forming a time constant to generate the predetermined interval.

According to an embodiment, the phase shift element includes a capacitor coupled to at least one resistor, the capacitor and the at least one resistor forming a time constant to generate the predetermined interval.

According to an embodiment, the signal processing assembly includes a microcontroller, the phase shift compensation element or the phase shift element being disposed in the microcontroller.

According to an embodiment, the microcontroller is further configured to receive at least one input signal from the sensor element or the variable control mechanism and to provide at least one control signal to control the series pass element, the at least one control signal having HIGH state and LOW state intervals.

According to an embodiment, the series pass element includes two switching elements and the at least one control signal includes separate control signals for controlling the two switching elements.

According to an embodiment, the two switching elements are series connected.

According to an embodiment, the separate control signals each assume the HIGH state for portions of a line cycle of the AC power, the HIGH state portions in combination covering a substantial portion of the line cycle irrespective of the user adjustable load setting.

According to an embodiment, one of the control signals is in a HIGH state at the same time that the other control signal is transitioning from a HIGH state to a LOW state, or is in a LOW state at the same time the other control signal is transitioning from a LOW to a HIGH state.

According to an embodiment, the two switching elements are a pair of field effect transistors each having a bypass element.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 8 is a block diagram of a series pass element that may be used in a power control device for avoiding voltage spikes according to an embodiment;

FIG. 9A is a graphical representation of the series pass element depicted in FIG. 8;

FIG. 9B is a graphical representation of the series pass element depicted in FIG. 8;

FIG. 9C is a graphical representation of the series pass element depicted in FIG. 8.

DETAILED DESCRIPTION

Figure 1:
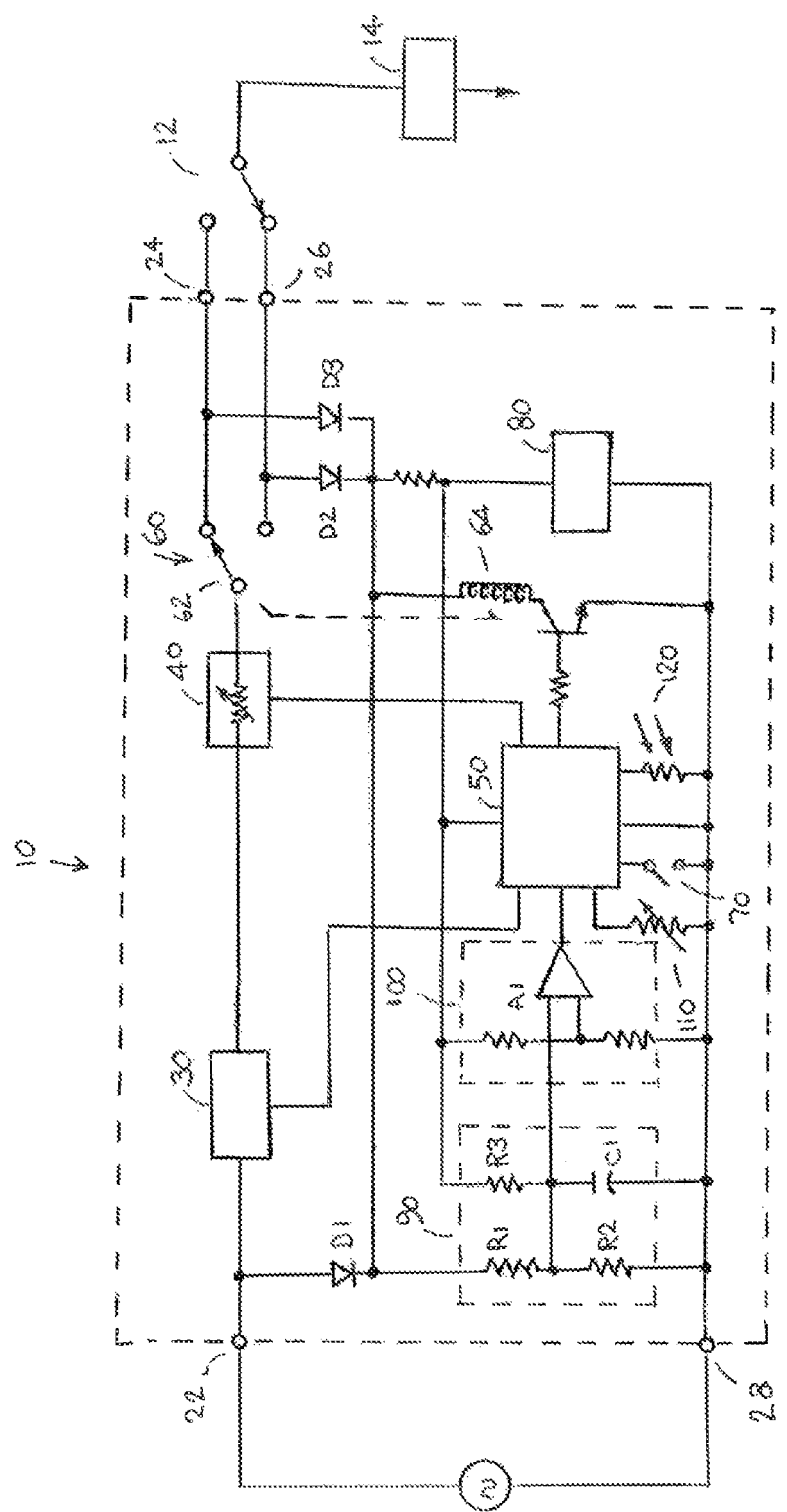
FIG. 1 is a detailed circuit diagram of a power control device according to an embodiment.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the power control device of the present invention is shown in FIG. 1, and is designated generally throughout by reference numeral 10.

As embodied herein, and depicted in FIG. 1, a circuit diagram of a power control device 10 in accordance with an embodiment of the present invention is disclosed. The device 10 includes a hot terminal 22, two traveler terminals (24, 26), and a return terminal 28. As shown in FIG. 1, hot terminal 22 is connected to the line conductor from the AC power source and return terminal 28 is connected to either the neutral conductor or the ground conductor returning to the AC power source. In other words, the AC power source is connected across terminals (22, 28). If device 10 is used in a three-way configuration, the "throw terminals" of a remote single pole-double throw power switch 12 are connected to traveler terminals (24, 26) and its pole terminal is connected to the load 14 (a lamp, motor, or both). The other side of the load is connected to the neutral conductor of the power source.

Power control device 10 conducts power from hot terminal 22 to traveller terminals (24, 26) by way of a current sensor 30, series pass element 40, and an internal single pole-double throw switch 60. Current sensor 30 senses load current and provides a signal to microcomputer 50 which uses that information to identify the lamp type, when current is conducting through the load. Sensor 30 is a shunt sensor, a Hall Effect sensor, a transformer, or a toroidal transformer. For the toroidal transformer, the conductor to the load passes through its central opening, forming the primary winding. The series pass element 40 restricts power provided to the load in accordance with a control signal from microcomputer 50. The series pass element includes solid devices such as a pair of MOSFETs or SCR's connected in series, rectifier diodes, thyristors, triacs, or IGBT's. Switch 60 is a relay comprised of a set of contacts 62 and a solenoid 64. User accessible switch 70, when actuated, sends a signal to microcomputer 50 which in turn sends a signal to solenoid 64 to control which of the two travellers (24, 26) is connected. When switch 60 and remote switch 12 is disconnected from the same traveller, the load goes OFF; conversely when connected to the same traveller, the load goes ON. Thus the two switches permit control of the load, from two different locations. Switch 60 may also be operated by an automatic command generated by microcomputer 50. By way of example, microcomputer 50 receives power from DC power supply 80 which is coupled to the line terminals (22, 28). When power is applied to the line terminals and charges DC power supply 80, microcomputer 50 signals switch 60 to momentarily toggle and turn the load current ON, if not on already. The current (or momentary current) flowing through load 14 is sensed by current sensor 30 that informs microcomputer 50 as to what kind of load or lamp type is a hand, Switch 60 may be a latching relay. In another embodiment (not shown), switch 60 is a mechanical switch that is directly operable by the user.

Microcomputer 50 provides the series pass element 40 with dimmer commands in accordance with user inputs, the current sensor 30 input, and software algorithms. The dimmer circuit, of course, provides a dimmed power signal to the load via the AC terminals 22, 28. As those skilled in the art will appreciate, dimming is accomplished in the reverse phase by switching the load current ON when the zero-crossing of the AC half-cycle is detected and turned OFF at a user adjustable phase angle. Conversely, in forward phase control, the load current is turned ON at the user adjustable phase angle and turned OFF at the next zero crossing. As those skilled in the art will appreciate, forward phase control is appropriate for conventional incandescent lighting, magnetic low voltage (MLV) lighting fixtures, conventional fluorescent lighting fixtures employing electronic ballasts (EFL), and halogen lighting. Reverse phase control is generally appropriate for electronic low voltage (ELV) lighting. Bulbs designed as higher efficiency 120V incandescent replacements, including LED bulbs and compact florescent lights (CFL) typically perform better with forward phase control. One of the universality features of the present invention is that the dimmer circuit may be employed in forward phase for certain optimized ELV, CFL and LED devices.

It can be important that zero cross detection accurately identify when the zero cross is occurring since the user adjustable phase angle relies on the zero crossing as a time base reference. Inaccuracies in the zero cross detection signal directly translate to inaccuracy in the user adjustable phase angle. Thus, the zero-cross detection preferably should remain accurate even during voltage transients or the user adjustable phase angle will fluctuate, causing the lamp to flicker.

Zero cross detection is accomplished in two steps that include a phase shift circuit 90 and a phase shift compensation circuit 100. Phase shift circuit 90 provides an output signal that by all rights inaccurately represents the zero cross positions but that at least provides a stable signal when there are voltage transients occurring. Phase shift circuit 90 is comprised of resistors R1, R2 and capacitor C1 that form a low pass filter and that may include a DC biasing component R3. The RC time constant of the low pass filter is in the range of 1 to 10 mS. Since the period of the AC line source is 16.7 mS this represents a considerable phase shift (25 to 100 degrees) but does manage to strip off high frequency components in the line voltage caused by line voltage transients. The result of this phase shift is there is a voltage on capacitor C1 at the zero cross that has an expected value. Phase shift compensation circuit 100 includes a comparator A1 that compares a DC reference voltage set to that value and the voltage from the low pass filter. The result is that comparator A1 provides a transition edge to microcomputer 50 at the zero crossing. This zero-cross signal is immune from line voltage transients and phase-shifted to occur accurately at the zero-crossing. However, as will be explained, just every other zero crossing will be accurately placed.

Device 10 also includes a user adjustable control 110 for controlling the phase angle of series pass element 40 by way of microcomputer 50. In an embodiment of the invention, series pass element 40 has a pair of control terminals and microcomputer 50 provides two control signals to series pass element 40, as will be explained in greater detail.

Device 10 may include other sensors for detection of an ambient condition such as temperature, humidity room occupancy, or surrounding light. As shown, device 10 includes an ambient light sensor 120. In order that light from load 14 not influence the ambient light measurement, microcomputer 50 may be programmed to interrogate sensor 120 only during portions of the AC line cycle when the series pass element has switched power to the load OFF.

There is a voltage at the DC reference input of comparator A1 is set at the voltage expected on capacitor C1 at the zero cross. Thus comparator A1 provides an output signal transition at the negative going zero-cross that is both stable in the presence of voltage transients, and accurately spotted.

As is shown, comparator A1 unfortunately does not provide transitions accurately spotted at the positive going zero-crosses. That would have required the output of comparator A1 to be a symmetrical square wave. Instead, the A1 output signal is an asymmetrical square wave, that is, a square wave not having a 50% duty cycle. Of course, series pass element 40 is a full wave device conducting in both AC polarities and so needs both the negative-going and positive-going zero cross signals. Instead of relying on the A1 output signal, the positive zero cross location is extrapolated by microcomputer 50, using the negative-going zero cross position as a frame of reference, microprocessor 50 adds to it an interval equal to half the period of the AC power source, to locate the positive-going zero cross (For a 60 Hz power source, the interval is 8.33 mS). Since the negative zero-cross placement is accurate, so will be the extrapolated, positive going zero-cross placement.

Figure 2:
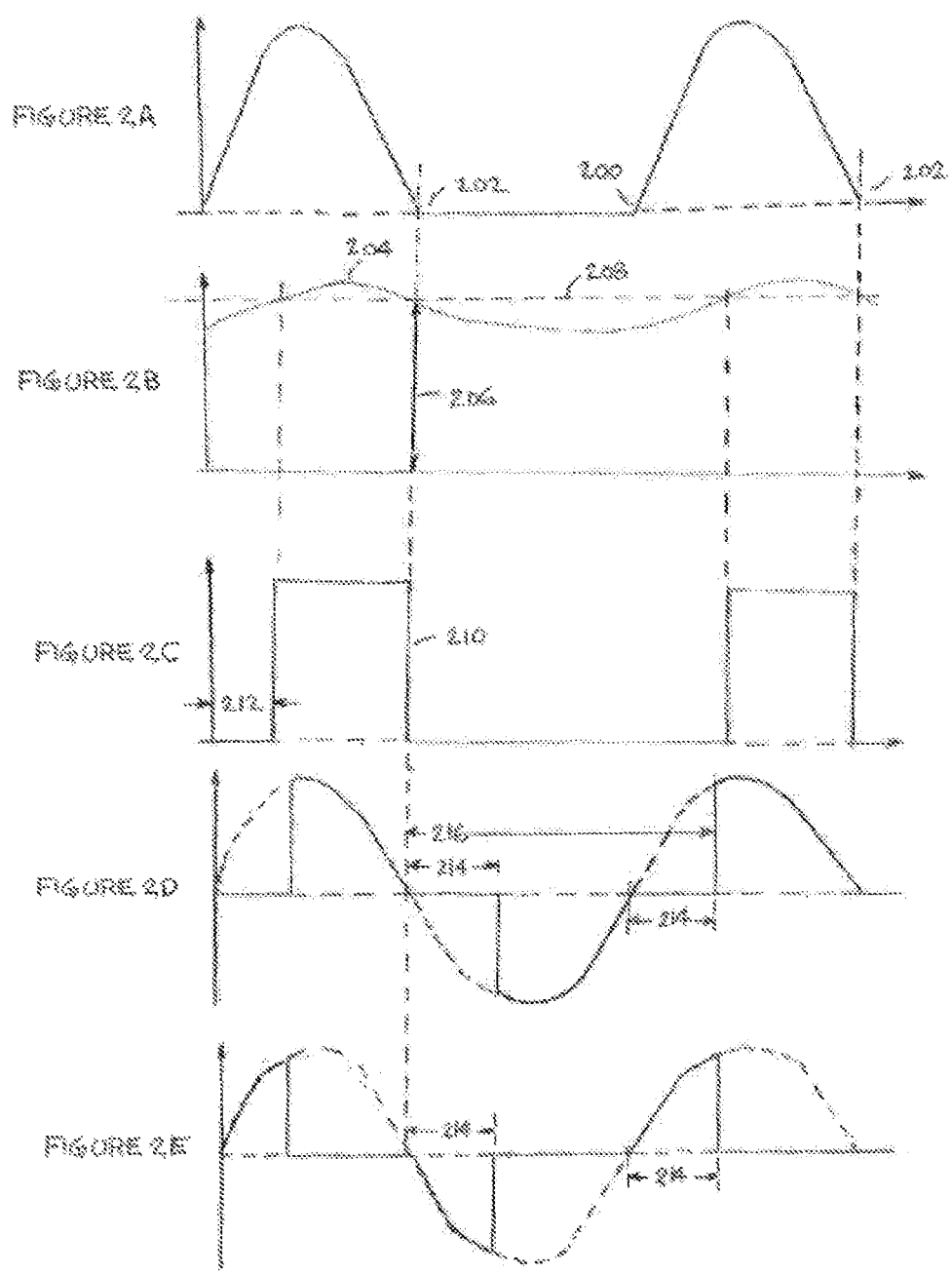
FIG. 2A is a chart showing a waveform according to an embodiment.
FIG. 2B is a chart showing a waveform according to an embodiment.
FIG. 2C is a chart showing a waveform according to an embodiment.
FIG. 2D is a chart showing a waveform according to an embodiment.
FIG. 2E is a chart showing a waveform according to an embodiment.

Referring to FIGS. 2A-E, charts showing waveforms associated with an embodiment of the present invention are depicted. FIG. 2A represents the half wave unfiltered DC from voltage divider (R1, R2), omitting capacitor C1 for the sake of discussion. Zero cross locations (200,202) are at the start and stop angles of the positive half cycle, their exact positions influenced by voltage transients. Zero cross 200 is referred to as the positive-going zero-cross whereas zero-cross 202 is referred to as the negative-going zero cross. In FIG. 2B, capacitor C1 has been included. The capacitor in combination with resistors (R1, R2) forms an RC time constant that, for the embodiment shown, is 5 mS. Although the zero cross placements are all but gone in the phase shifter output signal 204, there is a predetermined voltage 206 associated with the negative zero cross 202. Comparator A1 compares the phase shifter output signal 204 with a DC reference voltage 208 which is set at voltage 206. FIG. 2C depicts the output signal from comparator A1 whose negative transitions occur at negative zero-crossings 202 but whose positive transitions fail to align with the positive zero-crossings 200, by an interval 212.

FIG. 2D represents the load current of a dimmer (motor speed control) operating in a forward phase mode. The waveform uses the negative zero-crossing 202 as a recurring frame of reference. Series pass element 40 is OFF for an interval 214 during the negative half cycle, and then turns ON until its conclusion at the next positive zero crossing 200. Microcomputer 50 adds an interval 216 to the negative zero crossing in order to extrapolate the true position of the positive zero crossing. A second interval 214 is added to that. Series pass element 40 is OFF for the second interval 214 during the positive half cycle, and then turns ON until its conclusion at the next negative-going zero crossing 202. Summarizing, although the zero cross signal is asymmetrical, the current through load is symmetrical, having little or no DC component. FIG. 2E is similar to FIG. 2D, representing the dimmer (motor speed control) operating in a reverse phase mode. Here, load current starts flowing at negative and positive zero crossings, and stops flowing after intervals 214 until the next zero-crossing. For either mode (forward phase, reverse phase), the angle at the conclusions of intervals 214 is referred to as the current delay angle.

Those skilled in the art, in conjunction with a review of this disclosure, will appreciate that the positive-going zero cross can be extrapolated by microcomputer 50, by subtracting an interval 212 from the leading edge of the square wave. Also, the reference voltage of comparator A1 can be set at other than the voltage corresponding to the negative zero crossings. In another embodiment of the invention, the reference voltage is set to correspond to the voltage at positive-going zero crossings. As a result, positive-going zero crossings serve as the frame of reference. Microcomputer 50 extrapolates from the positive-going zero crosses the positions of the negative-going zero crossings. In another embodiment of the invention, the reference voltage of comparator A1 is set to not correspond with either voltage at the positive-going or negative-going zero crossings, and so from that intermediate frame of reference, microcomputer 50 extrapolates both the positive-going and negative-going zero cross locations.

Figure 3:
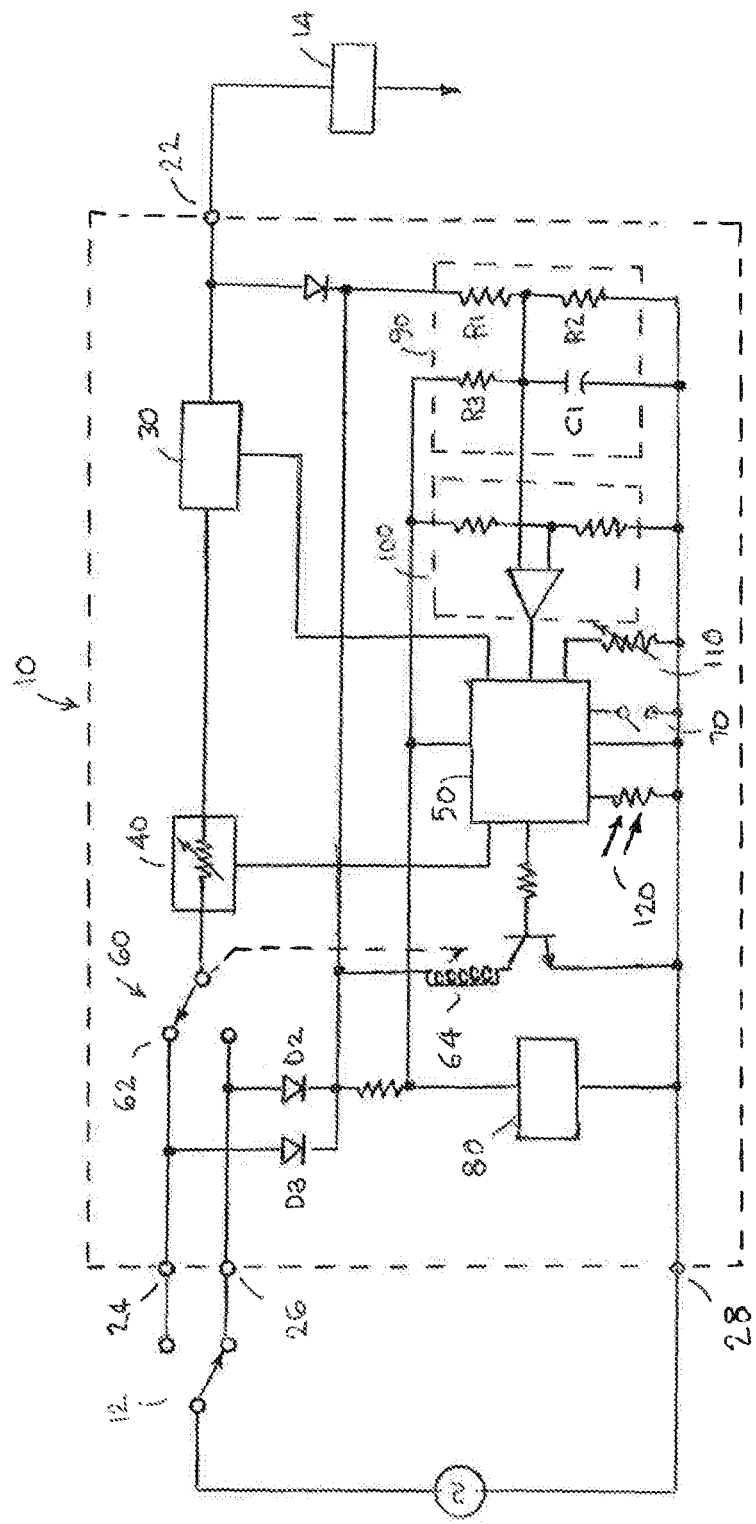
FIG. 3 is a detailed circuit diagram of a power control device according to an embodiment.

Referring to FIG. 3, a circuit diagram is provided that shows the line voltage being brought in through the remote switch 12 and load 14 is connected to hot terminal 22. Comparing this to FIG. 1, the power source and the load have been swapped. The AC power source still provides power to power supply 80, however this time through diode D2 or diode D3 depending on which traveller (24, 26) has been connected to the power source by remote switch 12. Series pass element 40 may be in an OFF state, and so now diode D1 is not a reliable source of power. Since power supply 80 is operative, it means device 10 will operate, in the manner that has been described.

Figure 4:
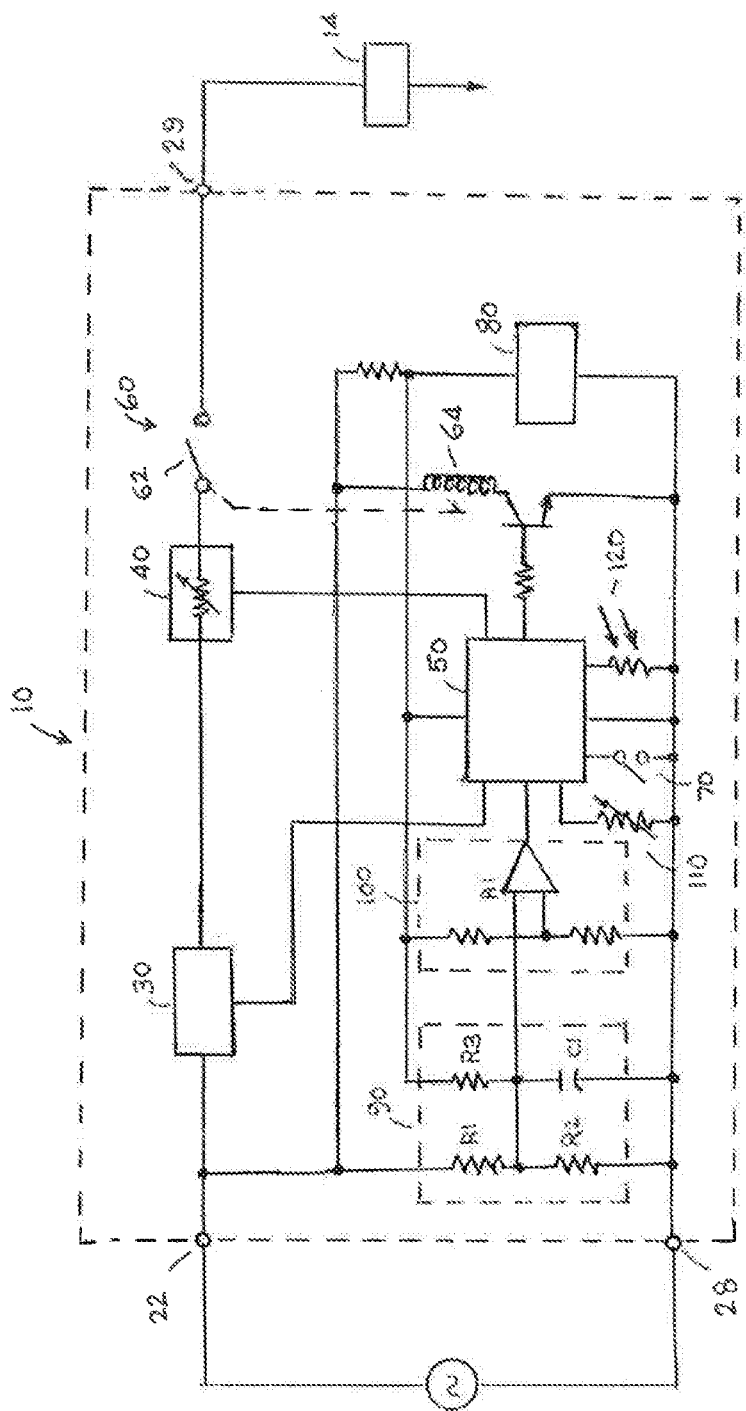
FIG. 4 is a detailed circuit diagram of a power control device according to an alternate embodiment.

Referring to FIG. 4, a circuit diagram showing an alternate embodiment of the invention is provided. FIG. 4 depicts a two way dimmer configuration that has a single load terminal 29 instead of the pair of traveller terminals; for the two-way dimmer there is no remote switch, thus no need for the two traveller terminals. Device 10 will not operate if the power source is connected to terminal 29 because diode D2 and D3 have been omitted and series pass element 40 is sometimes OFF. That means that power would not be reliably provided to power supply 80. Diode D1 is eliminated to save a component, but phase shift circuit 90 is now supplied AC instead of half wave rectified DC.

Figure 5:
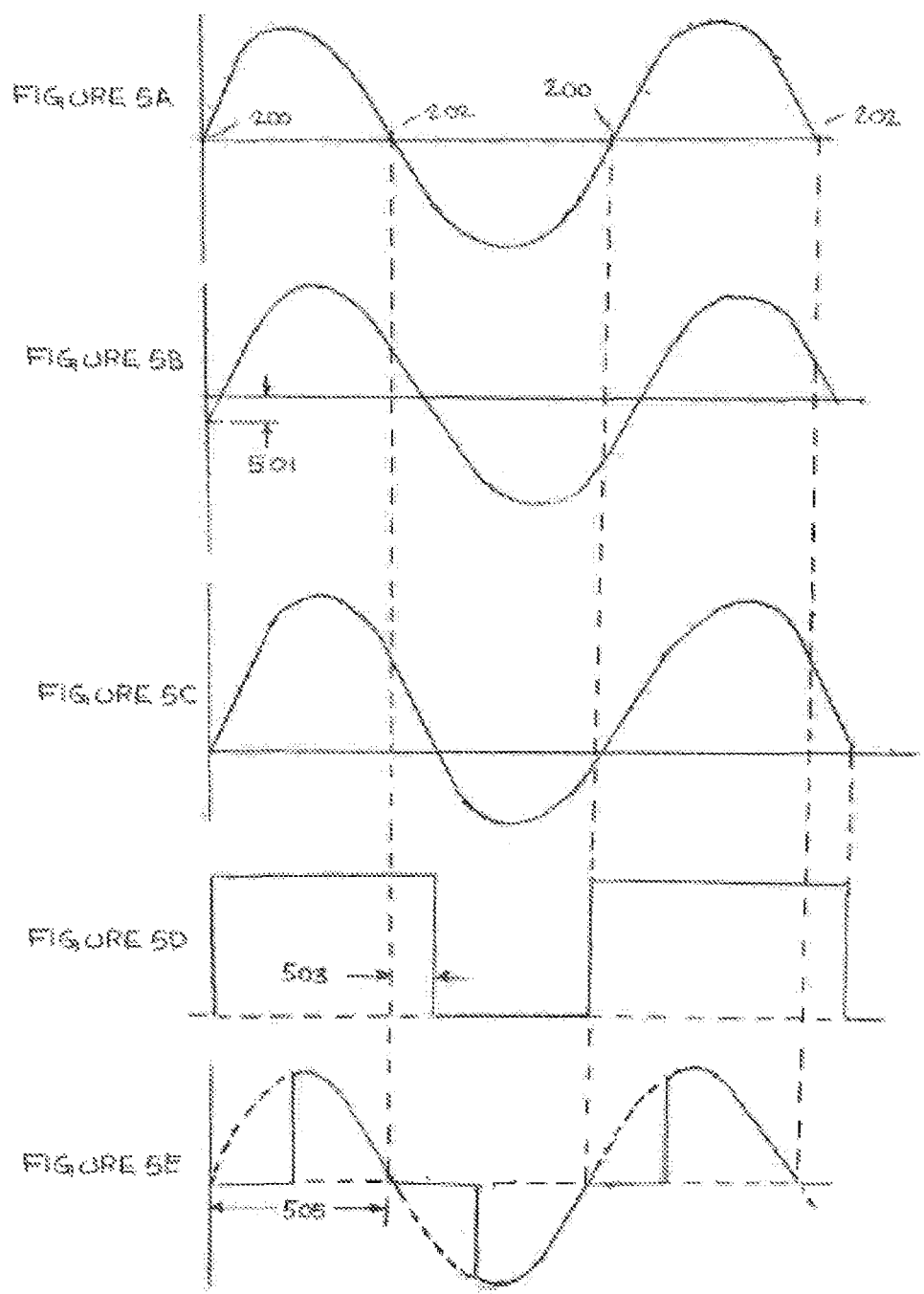
FIG. 5A is a chart showing a wave-shape according to an embodiment.
FIG. 5B is a chart showing a wave-shape according to an embodiment.
FIG. 5C is a chart showing a wave-shape according to an embodiment.
FIG. 5D is a chart showing a wave-shape according to an embodiment.
FIG. 5E is a chart showing a wave-shape according to an embodiment.

FIGS. 5A-5E are charts depicting various wave-shapes associated with the embodiment of FIG. 4. FIG. 5A depicts the AC waveform from voltage divider (R1, R2) with capacitor C1 omitted for purpose of discussion. FIG. 5B depicts the waveform with capacitor C1 in place, causing a phase shift. In FIG. 5C, a DC bias voltage 501 has been applied to the waveform of FIG. 5B (by way of a biasing resistor R3), translating the waveform so it goes positive at the positive-going zero crossings 200. FIG. 5D represents the output of comparator A1. With the reference voltage to comparator A1 being approximately 0 Volts, the output signal from comparator A1 goes HIGH at positive zero crossings 200, however, does not go LOW at negative zero crossings 202. Microcomputer 50 extrapolates the negative zero crossing positions by adding intervals 505 equal to half the period of the AC cycle relative to the HIGH state edges, or in an alternate embodiment subtracting interval 503 relative to the LOW state edges. As such, the positive zero crossings serve as a frame of reference. FIG. 5E shows that microcomputer 50 ultimately commands series pass element 40 to provide a symmetrically dimmed current to load 14.

Figure 6:
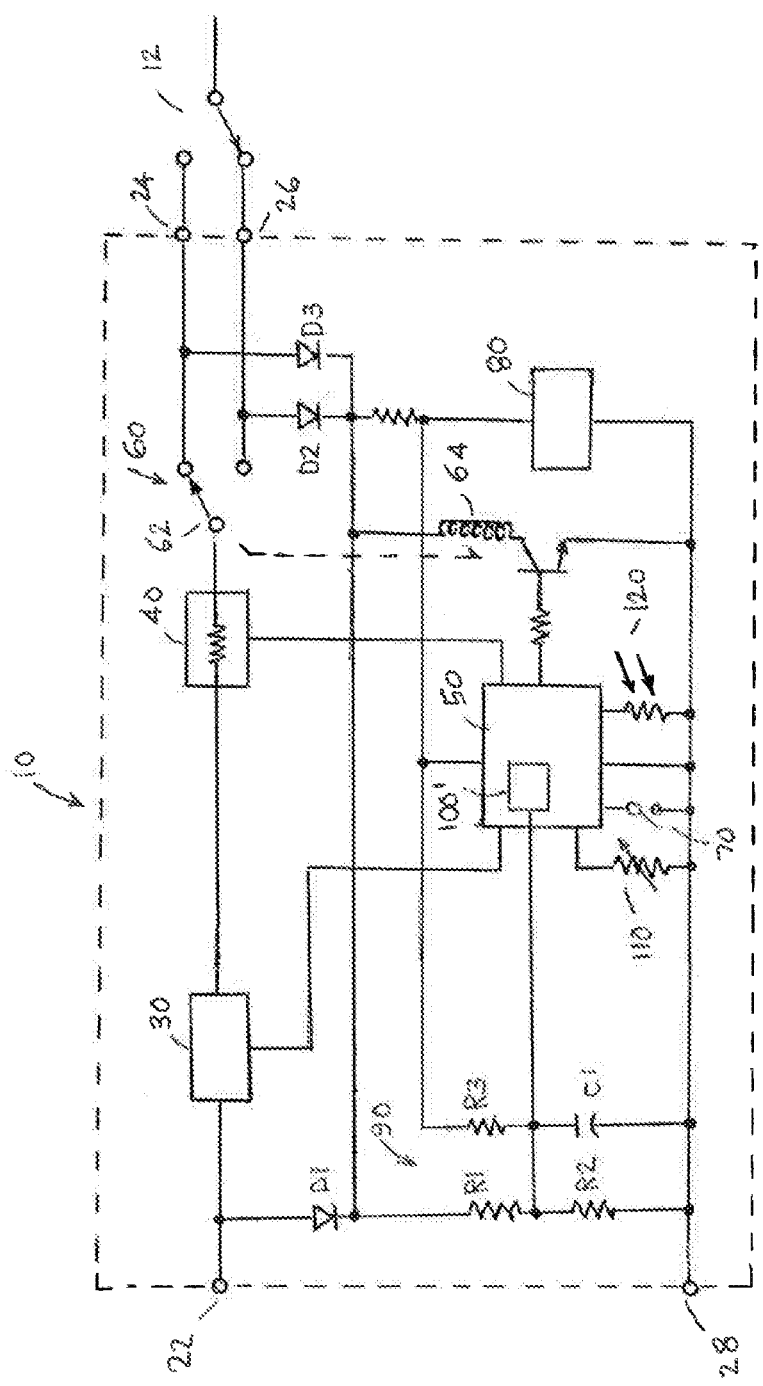
FIG. 6 is a detailed circuit diagram of a power control device according to an embodiment.

Referring to FIG. 6, another circuit diagram of an embodiment of the device 10 is shown, that is similar to other embodiments of the invention except phase shift compensation circuit 100 is replaced by phase compensator 100' in microcomputer 50. Phase shift compensator 100' still includes a comparator and DC reference and provides the zero-cross reference signal. Alternatively, phase shift compensator 100' includes an analog to digital (A/D) converter for converting the signal from phase shift circuit 90. Either way, compensator 100' provides a symmetrical signal representing the positive and negative-going zero crossings in the AC power source.

Figure 7:
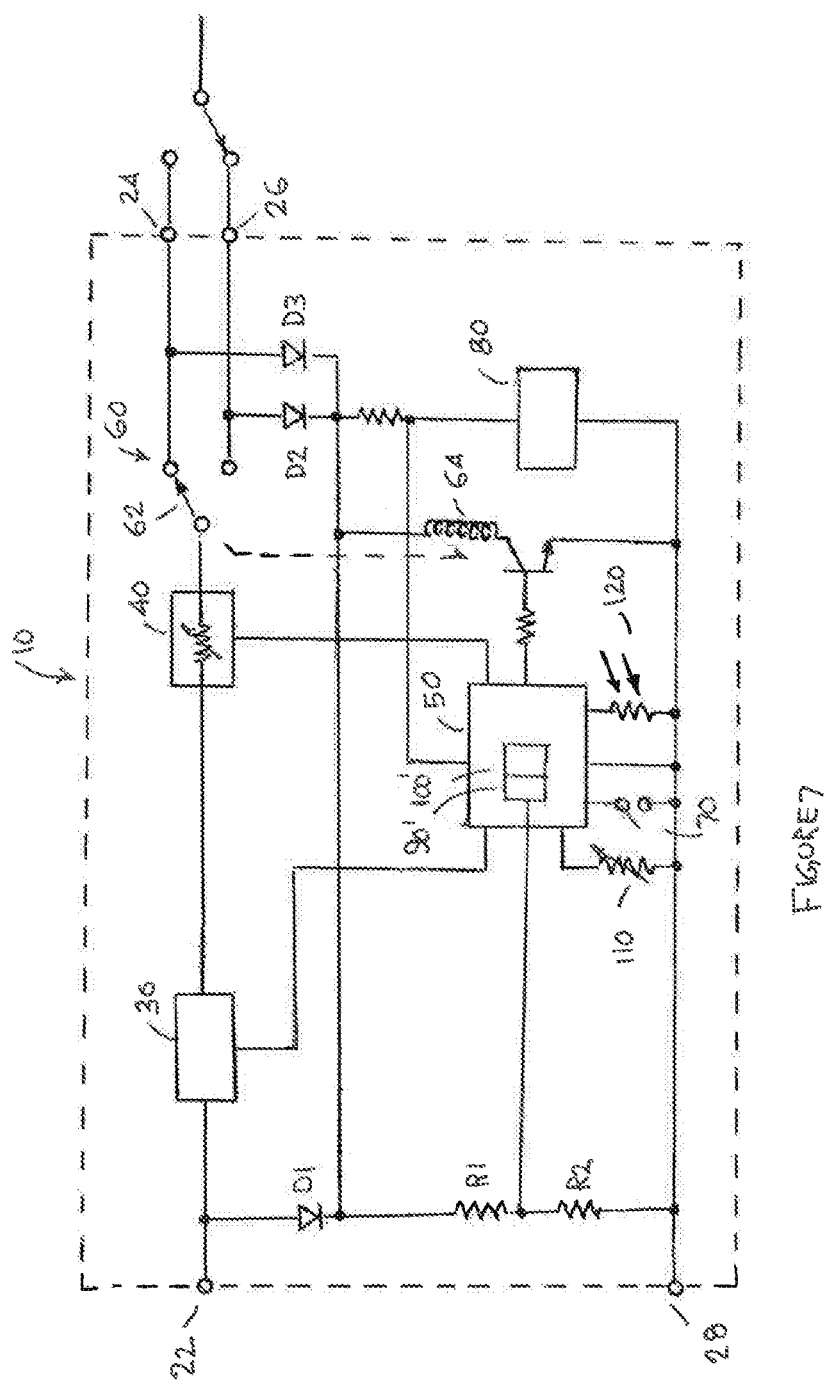
FIG. 7 is a detailed circuit diagram of a power control device according to an embodiment.

Referring to FIG. 7, another circuit diagram of an embodiment of the invention is shown, that is similar to the embodiment of FIG. 6, however phase shift circuit 90 is replaced by phase shifter 90' in microcomputer 50. Phase shifter 90' includes an analog to digital (A/D) converter that averages adjacent samples in the digital domain to produce a signal that is insensitive to line voltage transients. Phase shift compensator 100' then adds (or subtracts) time intervals so as to provide a symmetrical signal aligned with the positive and negative-going zero crossings in the AC power source. Microcomputer 50 then commands series pass element 40 to provide a symmetrically dimmed current to load 14.

As has been described, one type of lamp load is the magnetic low voltage (MLV) load, which has a characteristic inductance. Ideally, series pass element 40 would switch off the load at zero-crossings in the load current otherwise the back-emf of the inductance will cause a voltage spike that could damage components in series pass element 40 or in load 14 itself. However, microcomputer 50, and thus series pass element 40, is synchronized with zero crossings of the power source voltage. Since for the inductive load there will be a phase shift (current lags the voltage) there is a very real risk of damage due to voltage spikes.

Referring to FIG. 8, a block diagram of an embodiment of series pass element 40 is shown that may be used in device 10 for avoiding voltage spikes. This embodiment requires microcomputer 50 to provide two output signals. 50-1 and 50-2 to independently control power switching device 400, 402 (sub elements) in series pass element 40. Power switching devices 400,402 are series connected. Power switching device 400 is represented by a FET (MOSFET) 400-4 and bypass element 400-2 whereas power switching device 402 is represented by a FET (MOSFET) 402-4, and a bypass element 402-2.

Describing how the two FET's are controlled, a cycle of the power source is split into four regions (see FIG. 9). The first region begins at the positive voltage half cycle, FET 400-4 is turned OFF, and FET 402-4 stays ON. For a substantial portion of region 1 there will be no load current because bypass element 400-2 and FET 400-4 are blocking it. The second region starts at the current delay angle occurring in the positive half cycle. FET 400-4 is turned ON and FET 402-4 stays ON. Now load current starts flowing through FET 400-4 and either bypass element 402-2 or FET 402-4, whichever of the two has a lesser impedance. Region 3 starts at the negative-going voltage zero cross. FET 402-4 is turned OFF but FET 400-4 stays ON. Even though the line voltage is now in the negative half cycle, the load current is still in the positive half cycle due to the phase lag. Inductive flyback current flows through FET 400-4, and diode 402-2. Despite the fact that FET 402-4 has turned OFF, there is no voltage spike across it due to the clamping action of bypass element 402-2. The inductive flyback current typically decays in less than a millisecond. Once that happens, there is no current flow since FET 402-4 and bypass element 402-2 are blocking the forward current that would otherwise flow during the negative voltage half cycle. Region 4 starts at the current delay angle in the negative half cycle. FET 402-4 is now turned ON. Load current starts flowing through FET 402-4 and either FET 400-4 or bypass element 400-2, whichever of the two has a lesser impedance.

Another first region begins at the start of the next positive half cycle. As before, FET 400-4 is turned OFF but FET 402-4 stays ON. Even though the line voltage is now in the positive half cycle, the load current is still in the negative half cycle due to the phase lag. The Inductive flyback current flows through FET 402-4, and bypass element 400-2. Despite the fact that FET 400-4 has just turned OFF, there is no voltage spike across it due to the clamping action of bypass element 400-2. The inductive flyback current typically decays in less than a millisecond. Once that happens, there is no current flow since FET 400-4 and bypass element 400-2 are blocking the forward current that would otherwise flow during the positive voltage half cycle. Summarizing, the load is OFF during substantial periods of regions 1 and 3 and ON during regions 2 and 4. The load is switched is switched ON and OFF using a switching scheme that avoids voltage spikes due to inductive flyback. The switching scheme also minimizes heat generated by the series pass element, the FETs serving to divert current from the comparatively less-conductive bypass elements. Of course, this scheme can also be used to advantage with non-inductive loads.

Referring to FIGS. 9A-C, graphical representations of the series pass element shown in FIG. 8 are depicted. FIG. 9A depicts the AC power source envelope portions 900,900' occurring respectively in the positive and negative half cycles. FETs 400-4, 402-4 turn ON power to load 14 at current delay angles 902,902' respectively in the positive and negative half cycles. The voltage is ON during intervals 904,904'. Load current waveforms 906,906' lag the ON-state voltage waveforms.

The control signal 50-1 waveform is depicted in FIG. 9B. FET 400-4 is OFF during the first region, starting at zero crossing 910 and ending at current delay 902 set by microcomputer 50. There is little or no current through load 14 during region 1 except for inductive flyback decay intervals 908'. Similarly, the control signal 50-2 waveform is depicted in FIG. 9C. FET 402-2 is OFF during the third region, starting at the zero crossing 910' and ending at the current delay angle 902' set by microcomputer 50. There is little or no current through load 14 during region 3 except for inductive flyback decay intervals 908. Series pass element 40 provides current to load 14 during regions 2, and 4, depicted as waveforms 906, 906'.

As has been shown, FET 400-4 or 402-4 are ON for a substantial portion of the AC line cycle regardless of the value of the current delay angle. In another embodiment of the invention two control signals from microcomputer 50 control two MOSFET transistors in series pass element 40 independently. One FET is ON at the moment the other is turned OFF and kept ON for the expected inductive flyback decay periods. This embodiment is illustrated as markers 912, 912'. Instead of FETs 400-4, 402-4 staying ON until zero crossings 910, 910', they need only stay ON until markers 912, 912' to suppress the voltage spikes that would otherwise be generated by the inductive flyback.

Figure 10:
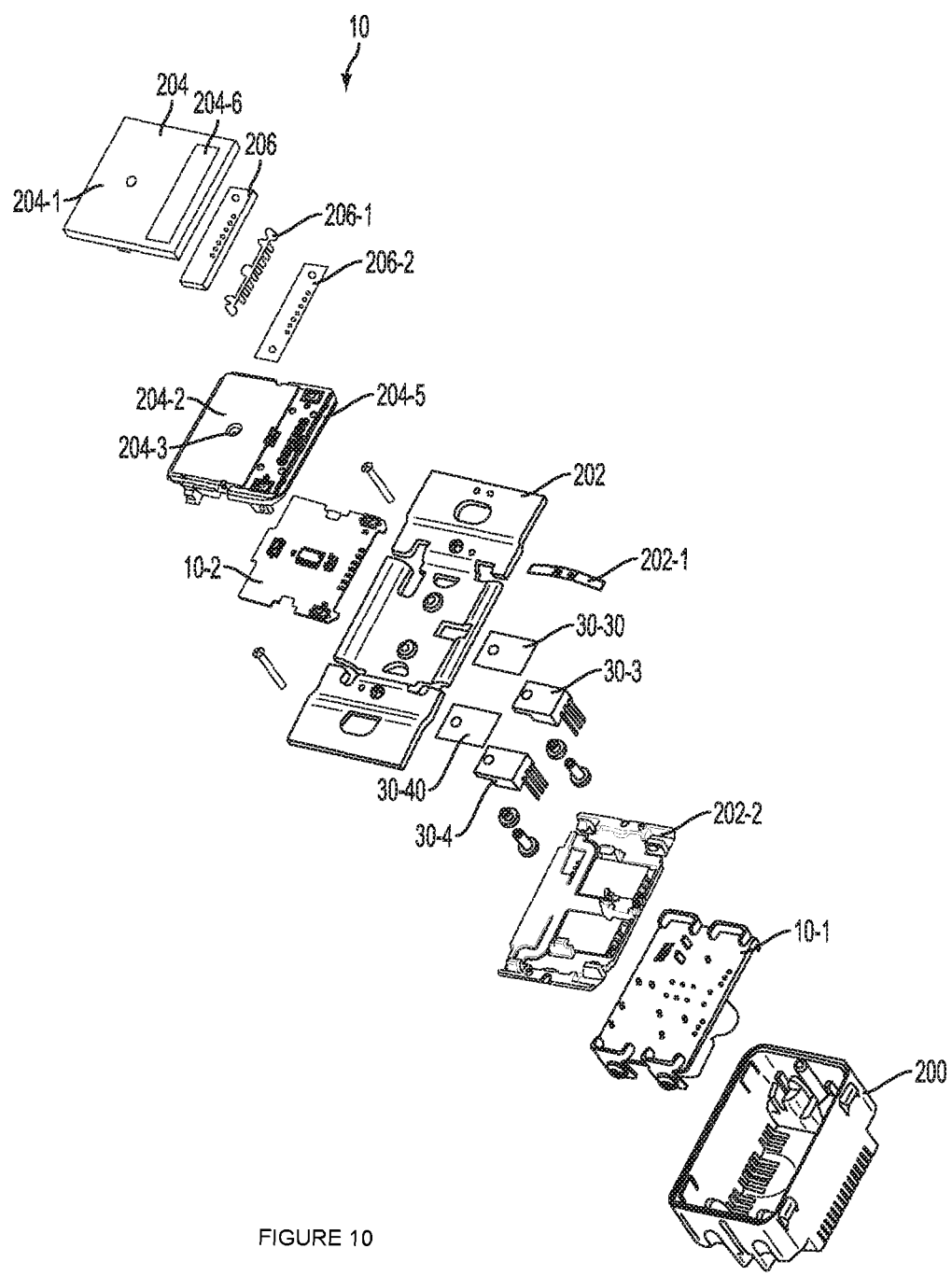
FIG. 10 is an exploded view of a power control device according to an embodiment.

Turning to FIG. 10, an exploded view of an embodiment of the power control device 10 is shown. The device 10 can include an aesthetic cover 204 that includes an LED lens 204-1 disposed in a central portion thereof In an embodiment of the invention, lens 204-1 is a thin section of cover 204. The aesthetic cover further includes an opening 204-6 that accommodates the dimmer switch cover 206. The dimmer switch cover 206 includes a light pipe structure 206-1 that is held in place within the dimmer cover 206 by an alignment mask 206-2. The dimmer cover 206, the light pipe 206-1 and the alignment mask 206-2 are configured to be disposed within opening 204-5 formed in one side of the functional switch actuator 204-2. The functional switch actuator 204-2 includes a central opening 204-3. The logic PCB 10-2 is shown over top of the front side of the heat sink 202. Note that ground clip spring 202-1 is attached to the rear side of the heat sink 202. The two MOSFETs 30-3 and 30-4 are coupled to the bottom of heat sink 202 by insulator members 30-30, 30-40, respectively. Of course, the MOSFETs 30-3 and 30-4 are electrically connected to the power handling PCB 10-1 via openings in the separator 202-2. The entire assembly is disposed within back body member 200.

Reference is made to U.S. Pat. No. 9,184,590, which is incorporated herein by reference as though fully set forth in its entirety, for a more detailed explanation of the universal power control device described therein and parts thereof, some of which may be employed in embodiments of the present invention. Citation/discussion of this or other references in this disclosure should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes.

To the extent that specific patents/publications/products are discussed herein, the descriptions/disclosures of which are all hereby incorporated by reference into this document in their respective entirety(ies).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:
1. An electrical wiring device comprising:
a housing assembly including a plurality of terminals at least partially disposed therein, the plurality of terminals being configured to be coupled to an AC power source and at least one electrical load;

a sensor element coupled to the plurality of terminals and configured to provide a sensor signal for monitoring at least one load power parameter of the at least one electrical load;

at least one variable control mechanism coupled to the housing assembly, the at least one variable control mechanism being configured to adjustably select a user adjustable load setting, the user adjustable load setting being adjustable between a minimum setting and a maximum setting;

a series pass element coupled between the AC power source and at least one electrical load, the series pass element being configured to regulate output power to the at least one electrical load in accordance with the user load setting;

an interface circuit coupled between the ac power available at the plurality of terminals, the interface circuit including at least one half wave rectifier coupled to a voltage divider configured to provide a half wave rectified signal; and a signal processing assembly including a time shifting element configured to substantially time shift the half wave rectified signal to provide a zero cross detection signal timed to occur at zero crossings in the AC power, wherein:

the time shifting element includes a comparator configured to compare the half wave rectified signal to a DC reference voltage;

the comparator provides the zero cross signal to a microcomputer; and the comparator and the microcomputer are disposed on separate printed circuit boards.

2. The device of claim 1, wherein the interface circuit includes a capacitor coupled to the voltage divider, the voltage divider including at least one resistor, the capacitor and the at least one resistor forming a time constant that substantially phase shifts the half wave rectified signal with respect to the AC power source, the time shifting element serving to compensate for the time constant to produce the zero cross detection signal.

3. The device of claim 1, wherein the voltage divider includes at least one reactive element.

4. The device of claim 1, wherein the interface circuit is coupled to a DC voltage source.

5. The device of claim 1, wherein the interface circuit includes a capacitor coupled to the voltage divider, the voltage divider including at least one resistor, the capacitor and the at least one resistor forming a time constant that substantially phase shifts the half wave rectified signal with respect to the AC power source, the time shifting element serving to compensate for the time constant to produce the zero cross detection signal.

6. The device of claim 1, wherein the signal processing assembly includes a microcontroller, the shifting element being disposed in the microcontroller.

7. The device of claim 6, wherein the microcontroller is further configured to receive at least one input signal from the sensor element or the variable control mechanism and to provide at least one control signal to control the series pass element, the at least one control signal having HIGH state and LOW state intervals.

8. The device of claim 7, wherein the series pass element includes two switching elements and the at least one control signal includes separate control signals for controlling the two switching elements.

9. The device of claim 8, wherein the two switching elements are series connected.

10. The device of claim 8, wherein the separate control signals each assume the HIGH state for portions of a line cycle of the AC power, the HIGH state portions in combination covering a substantial portion of the line cycle irrespective of the user adjustable load setting.

11. The device of claim 8, wherein one of the control signals is in a HIGH state at the same time that the other control signal is transitioning from a HIGH state to a LOW state, or is in a LOW state at the same time the other control signal is transitioning from a LOW state to a HIGH state.

12. The device of claim 8, wherein the two switching elements are a pair of field effect transistors each having a bypass element.

13. The device of claim 1, wherein the zero cross detection signal is a plurality of signals timed to occur at either negative-going or positive-going zero crossings of the AC power source.

14. The device of claim 1, wherein the plurality of terminals includes two traveller terminals, the at least one half wave rectifier including a diode coupled to each of the traveller terminals.

15. The device of claim 1, wherein the at least one half wave rectifier includes three rectifiers.

16. An electrical wiring device comprising:

a housing assembly including a plurality of terminals at least partially disposed therein, the plurality of terminals being configured to be coupled to an AC power source having a waveshape and at least one electrical load;

a sensor element coupled to the plurality of terminals and configured to provide a sensor signal for monitoring at least one load power parameter of the at least one electrical load;

at least one variable control mechanism coupled to the housing assembly, the at least one variable control mechanism being configured to adjustably select a user adjustable load setting, the user adjustable load setting being adjustable between a minimum setting and a maximum setting;

a series pass element coupled between the AC power source and at least one electrical load, the series pass element being configured to regulate output power to the at least one electrical load in accordance with the user load setting;

a phase shift element configured to substantially delay at least a portion of the waveshape by a predetermined interval to provide a phase-shifted output signal; and a phase shift compensation element configured to produce a zero-cross detection signal, the phase shift compensation element cancelling the predetermined interval such that the zero-cross detection signal is timed to occur at positive-going or negative-going zero crossings in the AC power source, wherein:

the phase shift compensation element or the phase shift element is disposed in a microcontroller;

the microcontroller is further configured to receive at least one input signal from the sensor element or the variable control mechanism and to provide at least one control signal to control the series pass element, the at least one control signal having HIGH state and LOW state intervals; and the series pass element includes two switching elements and the at least one control signal includes separate control signals for controlling the two switching elements.

17. The device of claim 16, wherein the phase shift compensation element includes a comparator configured to compare the phase-shifted output signal to a DC reference voltage.

18. The device of claim 17, wherein the comparator provides the zero cross signal to a microcomputer.

19. The device of claim 17, wherein the phase shift element includes a capacitor coupled to a voltage divider, the voltage divider including at least one resistor, the capacitor and the at least one resistor forming a time constant to generate the predetermined interval.

20. The device of claim 16, wherein the phase shift element includes a capacitor coupled to at least one resistor, the capacitor and the at least one resistor forming a time constant to generate the predetermined interval.

21. The device of claim 16, wherein the two switching elements are series connected.

22. The device of claim 16, wherein the separate control signals each assume the HIGH state for portions of a line cycle of the AC power, the HIGH state portions in combination covering a substantial portion of the line cycle irrespective of the user adjustable load setting.

23. The device of claim 16, wherein one of the control signals is in a HIGH state at the same time that the other control signal is transitioning from a HIGH state to a LOW state, or is in a LOW state at the same time the other control signal is transitioning from a LOW to a HIGH state.

24. The device of claim 16, wherein the two switching elements are a pair of field effect transistors each having a bypass element.

25. An electrical wiring device comprising:
a housing assembly including a plurality of terminals at least partially disposed therein, the plurality of terminals being configured to be coupled to an AC power source and at least one electrical load;
a sensor element coupled to the plurality of terminals and configured to provide a sensor signal for monitoring at least one load power parameter of the at least one electrical load;
at least one variable control mechanism coupled to the housing assembly, the at least one variable control mechanism being configured to adjustably select a user adjustable load setting, the user adjustable load setting being adjustable between a minimum setting and a maximum setting;
a series pass element coupled between the AC power source and at least one electrical load, the series pass element being configured to regulate output power to the at least one electrical load in accordance with the user load setting;
an interface circuit coupled between the ac power available at the plurality of terminals, the interface circuit including at least one half wave rectifier coupled to a voltage divider configured to provide a half wave rectified signal; and
a signal processing assembly including a time shifting element configured to substantially time shift the half wave rectified signal to provide a zero cross detection signal timed to occur at zero crossings in the AC power, wherein:
the signal processing assembly includes a microcontroller, the shifting element being disposed in the microcontroller;
the microcontroller is further configured to receive at least one input signal from the sensor element or the variable control mechanism and to provide at least one control signal to control the series pass element, the at least one control signal having HIGH state and LOW state intervals; and
the series pass element includes two switching elements and the at least one control signal includes separate control signals for controlling the two switching elements.

26. The device of claim 25, wherein the time shifting element includes a comparator configured to compare the half wave rectified signal to a DC reference voltage.

27. The device of claim 26, wherein the comparator provides the zero cross signal to a microcomputer.

28. The device of claim 27, wherein the comparator and the microcomputer are disposed on separate printed circuit boards.

29. The device of claim 28, wherein the interface circuit includes a capacitor coupled to the voltage divider, the voltage divider including at least one resistor, the capacitor and the at least one resistor forming a time constant that substantially phase shifts the half wave rectified signal with respect to the AC power source, the time shifting element serving to compensate for the time constant to produce the zero cross detection signal.

30. The device of claim 25, wherein the voltage divider includes at least one reactive element.

31. The device of claim 25, wherein the interface circuit is coupled to a DC voltage source.

32. The device of claim 25, wherein the interface circuit includes a capacitor coupled to the voltage divider, the voltage divider including at least one resistor, the capacitor and the at least one resistor forming a time constant that substantially phase shifts the half wave rectified signal with respect to the AC power source, the time shifting element serving to compensate for the time constant to produce the zero cross detection signal.

33. The device of claim 25, wherein the two switching elements are series connected.

34. The device of claim 25, wherein the separate control signals each assume the HIGH state for portions of a line cycle of the AC power, the HIGH state portions in combination covering a substantial portion of the line cycle irrespective of the user adjustable load setting.

35. The device of claim 25, wherein one of the control signals is in a HIGH state at the same time that the other control signal is transitioning from a HIGH state to a LOW state, or is in a LOW state at the same time the other control signal is transitioning from a LOW state to a HIGH state.

36. The device of claim 25, wherein the two switching elements are a pair of field effect transistors each having a bypass element.

37. The device of claim 25, wherein the zero cross detection signal is a plurality of signals timed to occur at either negative-going or positive-going zero crossings of the AC power source.

38. The device of claim 25, wherein the plurality of terminals includes two traveller terminals, the at least one half wave rectifier including a diode coupled to each of the traveller terminals.

39. The device of claim 25, wherein the at least one half wave rectifier includes three rectifiers.

* * * * *